March 13, 1962  R. B. HAWES  3,025,024
RADAR GUIDANCE CONTROL SYSTEM
Filed Dec. 7, 1954  5 Sheets-Sheet 1
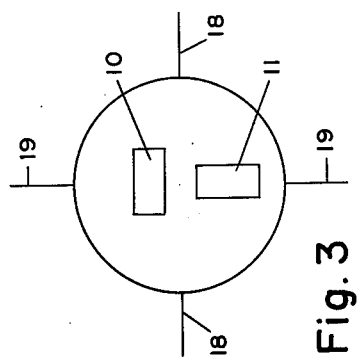
Fig. 3
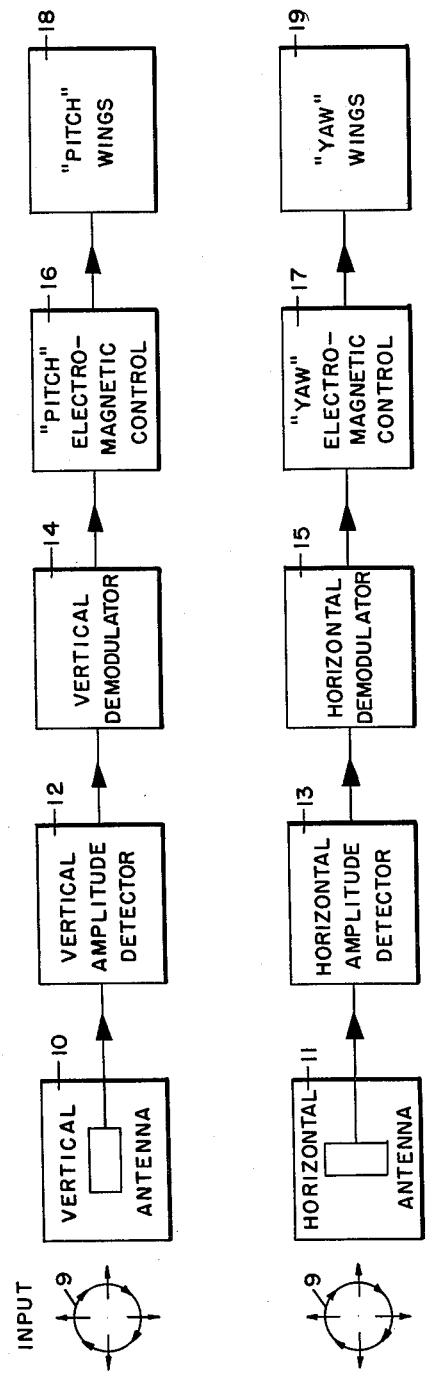
Fig. 2
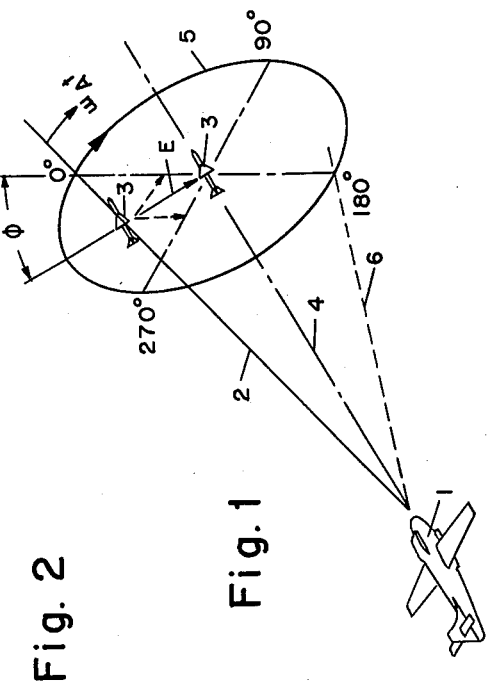
Fig. 1
Russell B. Hawes
INVENTOR.
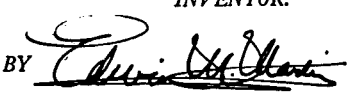
BY
Attorney March 13, 1962 R. B. HAWES 3,025,024
RADAR GUIDANCE CONTROL SYSTEM
Filed Dec. 7, 1954 5 Sheets-Sheet 2
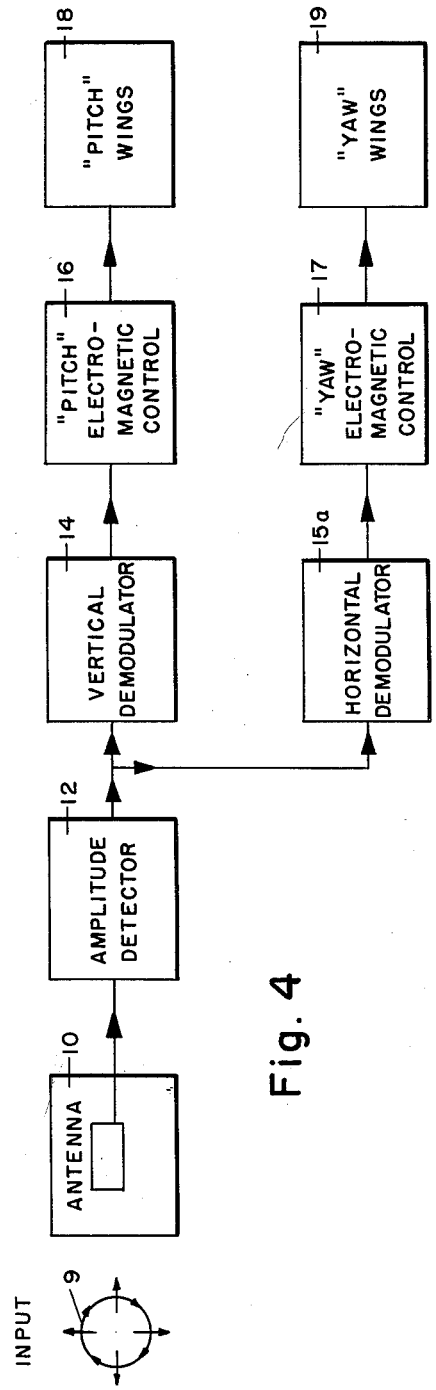
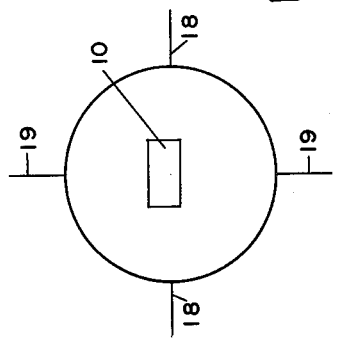
Russell B. Hawes
*INVENTOR.*
BY 
Attorney March 13, 1962 R. B. HAWES 3,025,024
RADAR GUIDANCE CONTROL SYSTEM
Filed Dec. 7, 1954 5 Sheets-Sheet 3
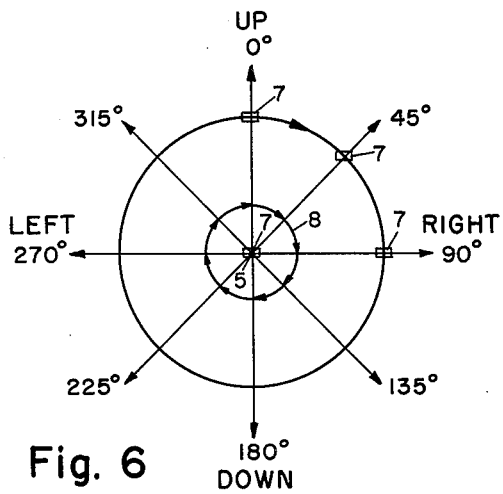
Fig. 6
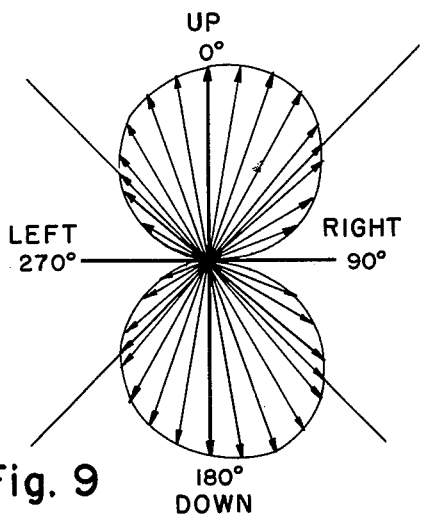
Fig. 9
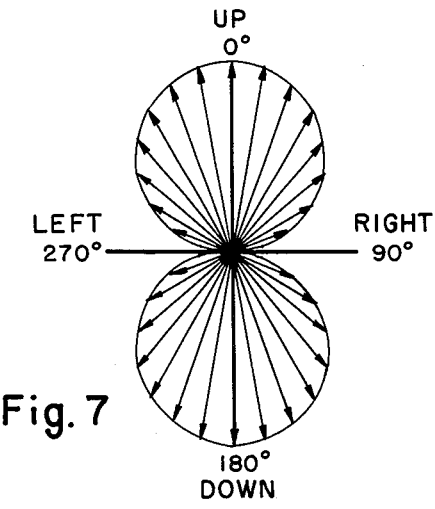
Fig. 7
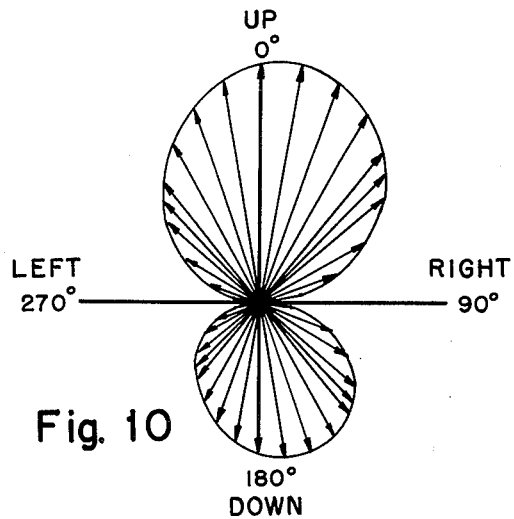
Fig. 10
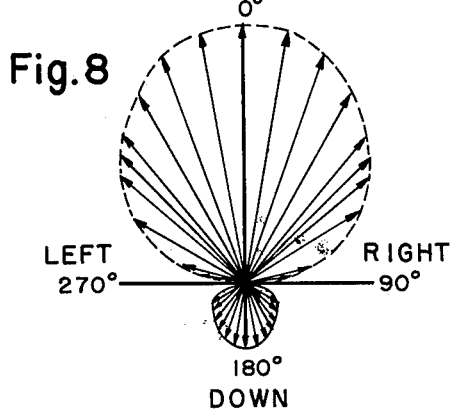
Fig. 8
Russell B. Hawes
*INVENTOR.*
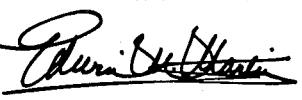
Attorney Russell B. Hawes
INVENTOR.

United States Patent Office 3,025,024
Patented Mar. 13, 1962

3,025,024
RADAR GUIDANCE CONTROL SYSTEM
Russell B. Hawes, Cambridge, Mass., assignor, by mesne assignments, to Sanders Associates, Incorporated, Nashua, N.H., a corporation of Delaware
Filed Dec. 7, 1954, Ser. No. 473,622
9 Claims. (Cl. 244—14)

The present invention relates to guidance control systems for aircraft. More particularly, this invention relates to guidance control of "beam rider" missiles wherein the missile is directed along the scanning axis of a conically scanning radar beam.

Beam rider systems of the prior art typically employ a conically scanning radar beam which is transmitted in a series of pulses at a predetermined rate. In such a system the missile is able to distinguish an error signal when it deviates from the scanning axis of the beam with reference to a pair of orthogonal coordinates arbitrarily termed "up-down" and "left-right," or "vertical" and "horizontal," or "pitch" and "yaw" axes, respectively. When the missile deviates from the scanning axis, the amplitudes of the received signal vary in accordance with its instantaneous position. The variations in amplitude of the received signals produce a sinusoidal envelope with a frequency equal to that of the scanning rate (nutations per second).

In the prior art such systems have been proposed for enabling the missile to distinguish "up-down" information from "left-right" information. The quadrant dual pulse system in current use involves four additional pulses in each nutation cycle which are closely spaced to four of the tracking pulses to form dual pulses (pairs of pulses) at equal intervals of the nutation cycle. The time displacement between the pulses of each pair differs from each dual pulse so that they may be distinguished by the missile as "fly-down," "fly-left," "fly-up" and "fly-right" commands. Another system in current use involves frequency modulation of the repetition rate of the tracking pulses in a predetermined manner related to the nutation cycle to accomplish a similar result.

British Patent No. 679,189, issued September 17, 1952, discloses a system for utilizing polarization modulation of a conically scanning radar control beam in which the plane of polarization rotates synchronously with the beam. That system, however, is inoperable in a practical application. As will be seen hereinafter, the present invention provides means improved over that in the British patent for resolving ambiguities in direction. Furthermore, it will be seen that the instant invention presents a novel and highly reliable improved demodulation system.

In this context the arbitrariness of the terms "up," "down," "left" and "right" is clear, since the missile may rotate, reversing its sense of direction relative to an absolute reference. In the prior art, an absolute inertial space reference is provided by free gyroscopes, for example, in both a master airplane and the missile to resolve ambiguities between "up-down" and "left-right" due to missile rotation. Since only the position of the missile relative to the guidance beam is required as opposed to its true position in space, the use of such an inertial space reference introduces an extraneous element in the transmission of information from a master airplane to the missile.

It is therefore an object of the present invention to provide an improved guidance control method and system of the type described in which the necessary information to differentiate the "up-down" axis from the "left-right" axis is contained in the beam.

A further object of the present invention is to provide an improved guidance control method and system of the type described in which the need for an absolute spatial reference is eliminated.

A still further object of the invention is to provide a guidance control method and system of the type described having improved means for resolving ambiguities in direction.

A still further object of the invention is to provide a guidance control method and system of the type described having improved means for maintaining control of a robot device during interruptions of the control beam.

Other and further objects of the present invention will be apparent from the following description of preferred embodiments, taken in connection with the accompanying drawings.

In accordance with the present invention there is provided a control system for a robot craft or device having horizontal and vertical systems. The system comprises a combination involving transmitting means which provide a plane-polarized, substantially conical scanning radar control beam. Means are provided for rotating the plane of polarization at the rate of scanning. Means including an antenna are carried by the device for producing a control signal in response to high frequency electromagnetic energy having an electric vector with a predetermined polarization. The control system also includes a direction-ambiguity resolver on the robot device which is responsive to the unidirectional voltage for conditioning the horizontal and vertical systems to respond solely and respectfully to horizontal and vertical information in the beam. Means responsive to the control signal control a selected characteristic of the device.

In a preferred embodiment there is provided a guidance control system for robot craft having horizontal and vertical control systems. The system comprises a combination involving a transmitting means which provides a plane-polarized, conical scanning radar control beam. Means are provided for rotating the plane of polarization at the rate of scanning. A first antenna means is carried by the robot craft or device and is responsive to high frequency electromagnetic energy having an electric vector with a first polarization for producing a first signal having successive peak amplitudes varying in alternate succession in accordance with an orthogonal coordinate of position of said craft relative to the scanning axis of the beam. A second antenna means is carried by the craft and is responsive to high frequency electromagnetic energy characterized by an electric vector perpendicular to the first vector for producing a second signal having successive peak amplitudes varying in alternate succession in accordance with another orthogonal coordinate of position of the craft relative to the scanning axis of the beam. Means for demodulating the first signal produces a first control voltage proportional to the variation in the peak amplitudes of the first signal. Means for demodulating the second signal produces a second control voltage proportional to the variation of the peak amplitudes of the second signal. The guidance control system for the robot craft also includes a direction-ambiguity resolver on the craft responsive to at least one of the control voltages for conditioning the horizontal and vertical control systems to respond solely and respectfully to horizontal and vertical information in the beam. Means are also provided for reversing the polarities of the control voltages in accordance with the degree of rotation of the craft or device. Control means responsive to the control voltages direct the craft along the axis of the beam.

In the accompanying drawings:

FIG. 1 illustrates an aircraft controlling a robot craft or device in accordance with the present invention;

FIG. 2 is a schematic block diagram of the preferred embodiment of the present invention;

FIG. 3 is a schematic diagram of the rear view of a robot device used in the embodiment of FIG. 1;

FIG. 4 is a schematic block diagram of a modification of the embodiment of FIG. 2;

FIG. 5 is a rear view of a robot device used in the modification of FIG. 4;

FIG. 6 is a graph in polar coordinates illustrating the motion and polarization of the radar control beam relative to an antenna;

FIG. 7 is a graph in polar coordinates of the signal power response of an antenna oriented on the scanning axis of a conical scanning radar beam;

FIG. 8 is a graph in polar coordinates of the signal power response of an antenna offset from the scanning axis of the beam at 0°;

FIG. 9 is a graph in polar coordinates of the power response of an antenna offset from the scanning axis of the beam at 90°;

FIG. 10 is a graph in polar coordinates of the power response of an antenna offset from the scanning axis of the beam at 45°;

Figure 11:
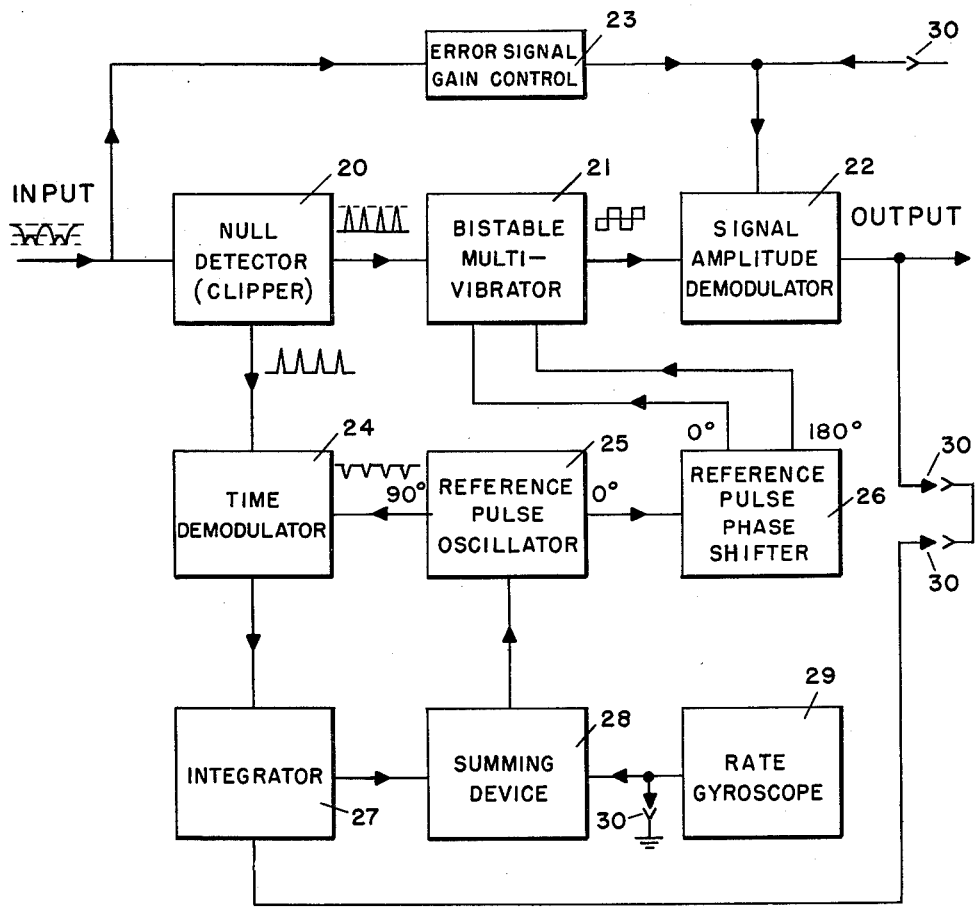
FIG. 11 is a detailed schematic block diagram of a part of the preferred embodiment.

Referring now in more detail to the drawings and with particular reference to FIG. 1, a master airplane 1 carries a radar transmitter, which produces a conical scanning beam having a central axis as shown at 2, and controls the guidance of a robot craft or device 3. The transmitting antenna may be, for example, a rotating, asymmetrically mounted dipole which produces a plane-polarized beam wherein the plane of roation rotates at the same rate as the beam center 2. Other transmitting systems may be used wherein the rate of rotation of the plane of polarization differs from the scanning rate. The rotation of the beam center 2 forms a conical beam of energy having a central axis 4 which is variously termed the "scanning axis," the "nutation axis," or the "boresight axis." The central axis 4 of the cone will hereinafter be referred to as the scanning axis of the beam to distinguish it from the central axis of the beam itself. The rotating or circular motion of the beam center 2 is indicated by a path 5, thus producing what is known as "conical scanning." The extreme lower portion of the beam is illustrated by a phantom line 6.

It will be seen that the conically scanning beam provides a reference system defined by the master airplane 1, as shown. The robot device 3 is here shown in two positions, on the scanning axis and displaced therefrom. When the device 3 is displaced, an error vector E forms an angle $\phi$ with the vertical axis as shown. The vertical and horizontal components of the vector E are shown in broken lines. The rotation of a vector defining the instantaneous positions of the beam center along the path 5 is indicated as the angle $\omega_A t$ (where $\omega_A t = 2\pi f_A$, $f_A$=the scanning frequency in cycles per second and $t$=time in seconds).

In FIG. 2 a block diagram is presented of a control system as provided for a beam rider guided missile. The rear of the missile carries directive receiving antennae, such as rectangular wave guides as used in the preferred embodiment, responsive to a predetermined polarization and disposed in quadrature as shown in FIG. 3.

In the embodiment of FIG. 2 each of the rectangular wave guide antennae is connected to separate demodulation channels as shown. In response to a conically scanning beam indicated at 9, a vertical antenna 10 and horizontal antenna 11 each apply sinusoidal, half-cycle signal pulses to vertical amplitude detector 12 and horizontal amplitude detector 13, respectively. The detectors may be conventional diode detector circuits each employing, for example, a 1N34 crystal diode. The output of the detector 12 is applied to a vertical demodulator 14 which produces an error signal in proportion to the differences in amplitude or area of successive half cycles. The error signal thus produced is applied to a "pitch" (up-down) electromagnetic control 16 which positions the "pitch" wings 18.

Analogously, the output of the detector 13 is applied to a horizontal demodulator 15. The error signal output of the demodulator 15 is applied to the "yaw" (left-right) electromagnetic control 17 to position the "yaw" wings 19.

In FIG. 3 the relative dispositions of the vertical antenna 10, pitch wings 18, horizontal antenna 11 and yaw wings 19 at the rear of a robot craft are schematically illustrated.

In the modification of FIG. 4, the antenna 10, disposed as shown in FIG. 5, provides a single source of signal pulses. The pulses are coupled to the detector 12, and the output of the detector is applied to the vertical demodulator 14 and a horizontal demodulator 15a in parallel. Here the single antenna provides both vertical and horizontal error information.

The operation of the invention will be examined first with particular reference to FIGS. 6, 7, 8, 9 and 10. The graphs of FIGS. 6 through 10 refer to the power response pattern of a single rectangular wave guide receiving antenna. The rotations of the beam and the plane of polarization are taken in degrees relative to the transmitted beam and the scanning axis and are here taken to be synchronous.

A rectangular wave guide exhibits maximum response to a signal characterized by an electric vector polarized perpendicular to the boundary defining dimension of the wave guide (the wider dimension), a minimum response (substantially zero) to energy characterized by an electric vector polarized parallel thereto. By disposing two such wave guide antennae in quadrature, each element produces a signal wherein the amplitude variations provide a measure of deviation from the center of the beam along its respective orthogonal coordinate (the preferred responsive direction).

The resultant output of each antenna has a modulation envelope comprised of a succession of half-wave pulses, the amplitudes of which vary in alternate succession as a function of the distance of the missile from the scanning axis. If, for example, the missile is precisely on the scanning axis there is substantially no variation in peak amplitude. Should the missile deviate from the beam, one of the antennae produces a pattern which varies in peak amplitude in proportion to the amount of deviation along its principal responsive axis, for example, the up-down or vertical axis. The other antenna, accordingly, produces a signal which varies in amplitude along the left-right or horizontal axis.

In FIG. 6 a rectangular wave guide antenna having a vertical preferred responsive direction is shown in various positions relative to the scanning axis of the beam as indicated at the origin O. The relative positions of the antenna 7 and the path 5 of the beam center are also illustrated. The rotation of the plane of polarization is illustrated by the arrows indicated at 8. The power response of the antenna, when displaced from the scanning axis varies with the instantaneous positions of the beam center. Thus, for example, when the antenna is disposed "up" at 0° as shown, maximum response is obtained when the beam center is also at 0°. When the beam is rotated 180°, minimum response is obtained. The percentage of amplitude modulation $m$ thus produced may be here defined as:

(1) $$m = \frac{\rho_{max} - \rho_{min}}{\rho_{max} + \rho_{min}} \times 100$$

where $\rho_{max}$ and $\rho_{min}$ are the respective maximum and minimum signal amplitudes received during one scanning cycle by an antenna exhibiting equal response to all directions of plane-polarization.

Since the plane of polarization is synchronized to the beam, rotation of the beam 90°, for example effects a 90° rotation of the plane of polarization. It will therefore be apparent that the response of the antenna 7 is a function of the degree of rotation of the beam about its scanning axis as well as the degree of rotation of the plane of polarization. It will be equally apparent that the position of the antenna relative to the reference system effects the response characteristic of the antenna 7. If, for example, the antenna is offset from the origin O along a line at 0°, it exhibits maximum response relative to the beam when the beam center is up (at 0°) and minimum response when it has rotated 180°. Maximum response of the antenna relative to the plane of polarization occurs at 0° and 180°, while minimum response occurs at 90° and 270°. This effect produces an asymmetrical power response pattern as will be described in greater detail hereinafter.

The response characteristic of the antenna may be expressed in terms of its output signal amplitude $\rho$ as follows:

(2) $$\rho = \underbrace{\alpha[1 + m \cos(\omega_A t + \phi)]}_{(a)} \times \underbrace{|\cos(\omega_p t + \lambda)|}_{(b)}$$

where $\alpha$ = the unmodulated signal envelope amplitude received by an antenna at a given position;

$m$ = the percentage of amplitude modulation as defined in (1) above;

$\omega_A$ = the angular velocity of the beam about its scanning axis;

$\omega_p$ = the angular velocity of the rotation of the plane of polarization;

$t$ = time in seconds;

$\phi$ = the angle of the antenna position relative to the origin; and $\lambda$ = angle of rotation of the antenna about its own axis due, for example, to the rotation of the missile itself.

Here $\omega_A = \omega_p$, therefore the rotations of the beam and plane of polarization are synchronous. The expression (2)(a) above represents the variation in $\rho$ as a function of the angle between the beam center and the antenna. The expression (2)(b) represents the variation in $\rho$ as a function of the angle of rotation of the plane of polarization.

As revealed by Equations 1 and 2, the boundary conditions for a response pattern, which is symmetrical about both the horizontal and vertical axes, occur when $m=1$, $\lambda=\phi=0$. These conditions are realized only when the antenna is disposed along the scanning axis. If the antenna deviates from the scanning axis, $m$ becomes less than 1, and the maxima in response due to the rotations of the beam and plane of polarization become synchronous. The resultant response pattern thus becomes asymmetrical about either or both of the horizontal and vertical axes. The degree of asymmetry about a given axis provides a measure of error (error signal) in the respective direction. This error signal may be detected from differences in voltage amplitudes and phase in the output of the antenna as will be seen below.

In FIG. 7, a graph of the power response of the antenna element located at the origin, as shown in FIG. 6, is presented. Since the antenna is at all times offset from the beam by an equal distance, no variation in amplitude due to the motion of the beam center is obtained. Then $\rho$ is a function only of the rotation of the plane of polarization. Since the amplitudes are equal and opposite when taken about either the vertical or horizontal axis, no error signal, in the sense of a difference control voltage output, can be detected.

FIG. 8 is a graph of the signal power response of the antenna oriented upwardly at 0° degrees relative to the origin as shown in FIG. 6. Here the antenna exhibits maximum response when the beam is at 0° and minimum response when the beam is at 180°. It will be apparent that the response patterns above and below the horizontal axis are asymmetrical, thereby producing a difference control voltage for error signals which may be used, for example, to direct the robot device downwardly. It is to be noted that the response pattern is completely symmetrical about the vertical axis thereby producing no error signal which would tend to direct the device to the right or to the left.

FIG. 9 is a graph of the power response of the antenna offset from the scanning axis at 90°. Here the signal response is symmetrical about the horizontal axis, thereby producing no error signal. The response is, however, asymmetrical about the vertical axis and provides an error signal to direct the device to the left.

FIG. 10 is a graph of the power response of the antenna offset from the scanning axis along a line at 45°. Here it is to be noted that the signal response is asymmetrical about both the horizontal and vertical axes, thereby producing error signals to direct the device down and to the right.

FIG. 11 is a schematic, block diagram of the vertical demodulator 14 as shown in FIGS. 2 and 4. The demodulator 14 includes a direction-ambiguity resolver which is responsive to voltages developed in the demodulator for conditioning the horizontal and vertical control systems to respond solely and respectfully to horizontal and vertical information in the beam. The output of the vertical amplitude detector 12 becomes the input as shown for the null detector 20. The detector 20 comprises a clipper circuit, producing trigger pulses in its output which are applied to a bi-stable multivibrator 21. The multivibrator controls a signal amplitude demodulator 22 which produces a control signal in its output. The input voltage is also applied through an error signal gain control 23 which supplies substantially a constant amplitude signal to the demodulator 22. A reference pulse oscillator 25 controls a reference pulse phase shifter 26 to produce reference pulses at 0° and 180° which are applied to a multivibrator 21 to control the phase of its output. Another output of the oscillator 25 is applied to a time demodulator 24 in conjunction with another output from the detector 20. If the outputs of the detector 20 and the oscillator 25 do not coincide, the demodulator 24 produces an error signal which is applied to an integrator 27. The output of the integrator 27 is applied to a summing device 28. A rate gyroscope 29 produces a rate of turn information signal voltage which is also applied to the summing device 28. The output of the summing device is applied to the oscillator 25 to control its instantaneous frequency. It will be seen (and hereinafter described in greater detail) that the detector 20, oscillator 25, demodulator 24, integrator 27, summing device 28 and the gyroscope 29 comprise a phase loop to control the frequency of the oscillator 25. Connections 30 permit calibration of the oscillator 25 before the missile is launched.

Typical circuits employed for the individual blocks in FIG. 11 may be found in volume 19 of the Massachusetts Institute of Technology Radiation Laboratory Series as edited by Louis N. Ridenour and published by McGraw-Hill. Volume 19 is entitled, "Waveforms." The null detector 20 is based on FIG. 3.6, multivibrator 21 on FIG. 5.6, demodulator 22 on FIG. 14.1a, time demodulator 24 on FIG. 14.19, oscillator 25 on FIG. 5.49, the phase shifter 26 on FIG. 5.10, and the integrator 27 on FIG. 18.39 of the above-mentioned volume 19. The rate gyroscope 29 includes a direct current converter. The summing device 28 here requires a simple resistive network as is well known in the art.

Although the above description is limited to the power response characteristic of a single antenna, its application to a pair of antennae in quadrature is clear. A single antenna produces an error signal proportional to offset of the antenna in a direction orthogonal to its principal responsive axis, but, as may be seen from the graphs, such an error signal is not as pronounced as that produced by displacements from the scanning axis along the principal responsive axis of the antenna. It will be appreciated that the sensitivity of a system may be increased markedly by using a pair of antennae in quadrature. For some applications the advantage of using a single antenna may be sufficient to overcome the disadvantage of somewhat decreased sensitivity.

The operation of the invention will now be described with particular reference to FIGS. 2, 3, 4, 5 and 12. The embodiment of FIG. 2 is a dual channel control system in which the outputs of the vertical antenna 10 and the horizontal antenna 11 are each coupled to the channels in response to an input signal as indicated at 9. The output of the vertical antenna is applied to an amplitude detector 12 which produces in its output the modulation envelope. The output of the detector is applied to a vertical demodulator 14 which produces in its output a vertical error signal in proportion to the difference in peak amplitudes or area of successive half-wave cycles.

The error signal produced by the vertical demodulator may be direct current or alternating current in character. If direct current is used, a command to "fly up" may be distinguished from "fly down" in accordance with the polarity of the control voltage. For example, a positive voltage may represent "fly up" and a negative voltage, "fly down." If alternating current is used, the phase of the error signal determines the command direction. Thus, if the first half cycle is positive, the command may be "fly up" and if negative, "fly down."

The output of the vertical demodulator 14 is applied to the vertical or "pitch" electromagnetic control 16 which positions the "pitch" wings 18. The output of the horizontal antenna 11 is applied to a similar channel comprising an amplitude detector 13, horizontal demodulator 15, yaw electromagnetic control 17 and yaw wings 19.

It will be seen that the outputs of each antenna for a given signal are analogous although 90° apart. Thus, the operation of the system need be discussed for only one channel.

Figure 12:
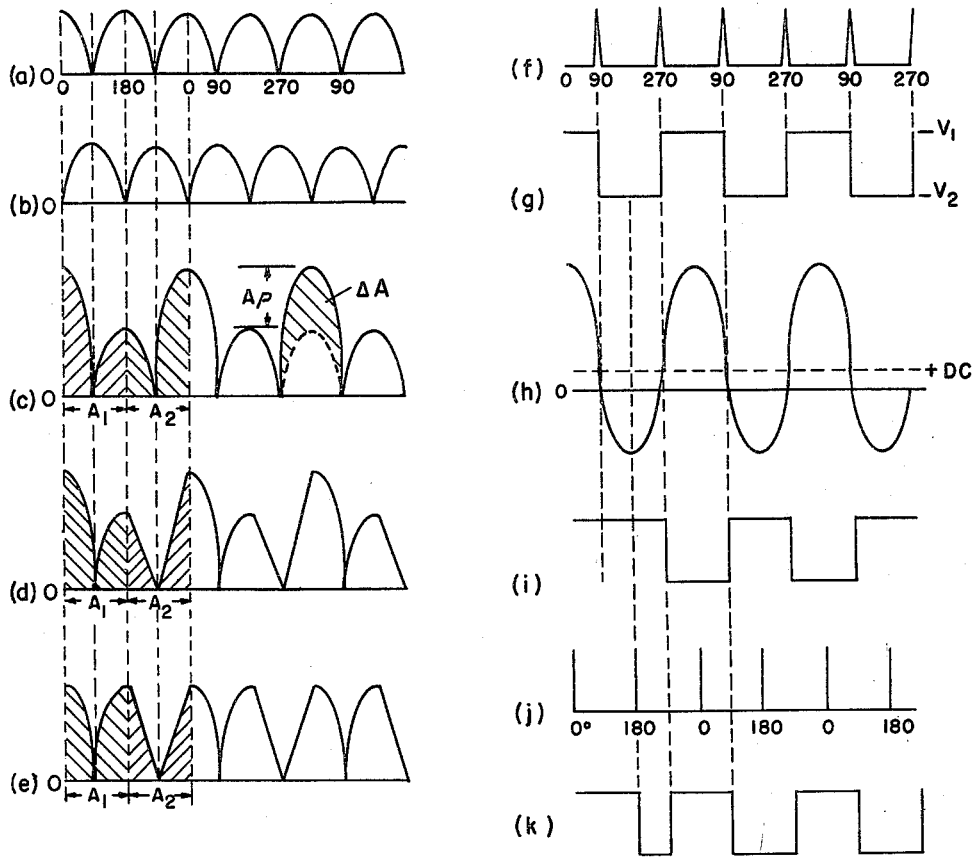
FIG. 12 is a series of wave forms associated with the operation of the embodiments illustrated.

The curve (a) of FIG. 12 illustrates the amplitude modulation envelope of the vertical antenna 10 when it is disposed along the scanning axis. The curve (b) of FIG. 12 illustrates the amplitude modulation envelope of the horizontal antenna 10 at that time. As mentioned above, the two curves are 90° out of phase relative to the scanning frequency. The curve (c) of FIG. 12 illustrates the amplitude modulation envelope of the output of the vertical antenna 10 when it is offset up from the scanning axis at 0°. It is to be noted that the difference, $\Delta \rho$, between the peak amplitudes of the half cycles in alternate succession provides a measure of the amount of deviation of the robot device from the scanning axis; it will be seen also that the difference in areas $\Delta A$ (as illustrated by the shaded portion of one of the larger half cycles) provides a similar measure. Therefore, the shaded areas $A_1$ and $A_2$ are equal, $|A_1-A_2|=0$, producing no horizontal error signal. The curve (d) of FIG. 12 illustrates the output of the antenna 10 when it is disposed offset from the scanning axis along a 45° line. In addition to the correction signals, provided by $\Delta \rho$ or $\Delta A$ in this case, the shaded areas in the regions $A_1$ and $A_2$ are asymmetrical and unequal; hence, $|A_1-A_2|$ is greater than 0, providing a measure of error along the horizontal axis as well. This result is due to the distortion of the successive half cycles in accordance with the fact that maximum response due to the relative beam position does not occur at the same time as maximum response due to the angle of the plane of polarization. The curve (e) of FIG. 12 illustrates the amplitude modulated output of the vertical antenna when it is disposed offset from the scanning axis along the horizontal axis. It will be noted that in this case $\Delta \rho = \Delta A = 0$, producing no vertical error signal. The difference between the areas ($|A_1-A_2|>>0$) in the regions $A_1$ and $A_2$ is relatively great and provides a strong horizontal error signal.

The operation of the system will now be discussed with particular reference to FIGS. 11 and 12. FIG. 11 is a schematic block diagram of the vertical demodulator 14. The principal function of the vertical demodulator as noted above is to provide an error signal output in proportion to the deviation of the missile from the scanning axis of the beam along the vertical axis. A second function of the vertical demodulator is to resolve ambiguities in direction due to the rotation of the missile about its own axis. As long as communication between the master plane and the missile via the beam remains uninterrupted, no ambiguities result. It will be appreciated from the above description that the system inherently operates in such a manner as to cause the missile to correct for such rotation by righting itself relative to the beam. Furthermore, in the event of such an interruption, if the missile should rotate less than ±90°, it would still be able to correct its roll attitude to conform with the 0° reference presented by the beam.

Should the missile rotate more than:

(3)      $\pm(2n+1)\pi/2$ radians but less than
$\pm(2n+1)3\pi/2$ radians, where
$n_k = 0, 2, 4, \ldots, 2k, \ldots$ it would correct its roll attitude to conform 180° out of phase with the 0° beam reference. In this condition an instruction to "fly down" would cause the missile to "fly up"; an instruction to "fly left" would cause the missile to "fly right." The control system thus provides a regenerative error signal instead of the desired degenerative error signal.

Where such extended interruptions may be encountered, it is clear that some mechanism is required for providing information to the missile as to its roll attitude relative to the reference beam. In the block diagram of FIG. 11, the received signal contains two kinds of information which are useful in providing an error control signal. As discussed above, variations in amplitude provide a measure of physical displacement from the scanning axis. The nulls which occur every 180° provide time reference information which may be used to convert the half-wave pulsating direct current into an alternating voltage. The input to the demodulator comprises the amplitude detected modulation envelope as illustrated, for example, in the curve (c) of FIG. 12, and is applied to a null detector 20, which is simply a clipper circuit and amplifier providing trigger pulses in its output as shown in the curve (f) of FIG. 12. The signal trigger pulses are applied to a bi-stable multivibrator 21. The vibrator reverses the polarity of its voltage output in response to each trigger thereby producing a square wave output as shown in the curve (g) of FIG. 12. In turn, the vibrator output controls the switching time of a signal amplitude demodulator 22.

The original input signal is applied through an error signal gain control 23 to provide the signal input to the demodulator 22, which reverses the polarity of one of the signal half-wave pulses as illustrated in the curve (*h*) of FIG. 12. Since the positive and negative peaks are asymmetrical, this wave form has an average direct current level which is positive as shown. A filter in the demodulator bypasses the alternating current component to produce in its ouput a pure direct current error signal.

A voltage sensitive reference pulse oscillator 25 maintains a time reference in the absence of a signal. An output of the oscillator circuit is applied to a time demodulator 24. If the signal and reference pulses are synchronous, the demodulator 24 produces zero voltage in its output. If, however, the reference pulses do not occur at the same time as the signal pulses, the demodulator produces an output voltage which is positive or negative in accordance with the relative lag or lead in time position of the reference pulses with respect to the signal pulses. The output of the demodulator 24 is applied to an integrator 27 and thence to a summing device which, in turn, applies a control voltage to the reference oscillator 25 to effect an instantaneous frequency shift to correct the error in time position. The oscillator 25, demodulator 24 and integrator 27, thus form a closed, integrating phase loop.

When, for some reason, the transmitted beam is interrupted, the fly-wheel action of the reference oscillator continues to provide reference trigger pulses. Even if the missile does not rotate about its output axis, the reappearance of a signal may produce an ambiguous error control signal. The bi-stable multivibrator changes its state whenever it is triggered by a pulse from the detector 20 applied to its complement input; i.e., its voltage output reverts from $V_1$ to $V_2$ or $V_2$ to $V_1$, as shown in the curve (*g*) of FIG. 12. Since the multivibrator does not change state unless triggered, the loss of an odd number of trigger pulses causes a phase reversal in the square wave as shown in the curve (*i*) of FIG. 12. To preclude such an ambiguity, an output of the oscillator 25 is shifted 90° in phase and applied to a reference pulse shifter 26 which provides phased reference pulses at 0° and 180° for the vibrator 21 [curve (*j*) of FIG. 12]. As seen from the drawing, these reference pulses are applied to "zero" and "one" inputs $V_1$ and $V_2$ outputs, respectively, of the multivibrator. A pulse applied to one of these latter inputs can change the state of the multivibrator only if it is in the state corresponding to the other input. Thus, if the multivibrator output square wave is phased properly, the phase reference pulses have no effect since the 0° pulses only produce a $V_1$ output and the 180° pulses only a $V_2$ output.

If the missile rotates about its axis more than ±90° but less than ±270°, or a suitable multiple thereof as noted in (3) above, the square wave output of the multivibrator 21 is 180° out of phase with the incoming signal. This results in the regenerative error signal output hereinbefore referred to. A rate gyroscope 29 circuit (ordinarily present as a damping control) produces an output voltage which is applied to the summing device 28 to add to the output of the integrator 27 and shift the phase of the output of the oscillator 25. The output of the phase shifter 26 is shifted accordingly to control the multivibrator 21 as outlined previously. The correction provided by the gyroscope 29 is very fast, which precludes the square wave output of the multivibrator 21 from shifting out of phase. It is to be noted that the gyroscope need not be extremely accurate since only a 180° correction is required.

The frequency of the oscillator is calibrated through connections 30 from the master airplane. A simulated signal is applied to the demodulator 22 which produces an error signal which is, in turn, applied to the integrator 27, the summing device 28, and thence to the oscillator 26 to cause it to synchronize with the scanning frequency. Another approach to the resolution of the ambiguity created by the rotation of the missile, is to use what may be termed a "trial and error system." In the trial and error method the missile assumes a direction in response to a command, for example, to "fly up." If in so doing the error signal increases, the demodulation circuits which are sensitive to an increased error reverse the polarity of the error signal and cause the missile to "fly down." The trial and error method eliminates the need for a rate gyroscope, which is a very costly device and presents a possible production bottleneck in times of emergency.

It is to be noted that the above system is useful with either continuous wave or pulse transmission. In a practical situation involving pulse transmission having a pulse repetition rate of 2,000 cycles and a scanning frequency of 50 cycles, there would seem to be some uncertainty as to the precise time position of the signal nulls. Since a half cycle of the amplitude modulation envelope is provided by only 20 transmitted pulses, the instantaneous indications of time positions may vary ±9°. In terms of ambiguity resolution, however, the null uncertainty produces no special problem. The error in the error signal output may be considered to be statistical and is therefore negligible for a large group of pulses.

The present invention has ready application to many control systems in which more than two reference axes are required. The use of more than two reference axes implies a scanning frequency which differs from the rotation frequency of the plane of polarization.

While there has been hereinbefore described what are at present considered preferred embodiments of the present invention, it will be apparent that many and various changes and modifications may be made with respect to the embodiments illustrated, without departing from the spirit of the invention. It will be understood, therefore, that all those changes and modifications as fall fairly within the scope of the present invention, as defined in the appended claims, are to be considered as a part of the present invention.

What is claimed is:

1. A beam-rider, guidance control system for a robot aircraft subject to roll, comprising: transmitting means providing a plane-polarized, substantially conically scanning, radar control beam; means coupled to said transmitting means for rotating said plane of polarization; an antenna on said robot responsive to an electric component in a preferred direction of said plane-polarized beam, said antenna response varying in accordance with the relative angle between said electric component and said antenna as produced by said polarization rotation and said roll of said robot; a detector means coupled to said antenna for developing a varying, unidirectional signal representative of the degree of antenna response to said electric component; a signal amplitude detection system coupled to said detector means for deriving a direction control signal from said unidirectional signal; a control circuit coupled to said detection system and sensitive to said roll of said robot for developing a control signal representative of the degree of said roll to control the operation of said detection system to compensate for the effect of said roll on said antenna response; and means for utilizing said control signal to control the resultant direction of said robot with respect to the scanning axis of said radar beam.

2. A beam-rider, guidance control system for a robot aircraft subject to roll, comprising: transmitting means providing a plane-polarized, substantially conically scanning, radar control beam; means coupled to said transmitting means for rotating said plane of polarization; a pair of mutually orthogonal antenna elements disposed on said robot, each of said elements being responsive to an electric component in a preferred orthogonal direction of said plane-polarized beam, said antenna response varying in accordance with the relative angle between said electric component and each of said antenna elements as produced by said polarization rotation and said roll of said robot; a detector means coupled to said antenna elements for developing varying, unidirectional signals representative of the degree of response of each of said elements to said electric component; a signal amplitude detection system coupled to said detector means for deriving a pair of orthogonal direction control signals from said unidirectional signal; a control circuit coupled to said detection system and sensitive to said roll of said robot for developing a signal representative of the degree of said roll to control the operation of said detection system to compensate for the effect of said roll on said antenna response; and means for utilizing said orthogonal direction signals to control the resultant direction of said robot with respect to the scanning axis of said radar beam.

3. A beam-rider, guidance control system for a robot aircraft subject to roll, comprising: transmitting means providing a plane-polarized, substantially conically scanning, radar control beam; means coupled to said transmitting means for rotating said plane of polarization; a pair of mutually orthogonal antenna elements disposed on said robot, each of said elements being responsive to an electric component in a preferred orthogonal direction of said plane-polarized beam, said antenna response varying in accordance with the relative angle between said electric component and each of said antenna elements as produced by said polarization rotation and said roll of said robot; a detector means coupled to said antenna elements for developing varying, unidirectional signals representative of the degree of response of each of said elements to said electric component; a signal amplitude detection system coupled to said detector means for deriving a pair of orthogonal direction control signals from said unidirectional signal; a control circuit coupled to said detection system and including a rate gyroscope sensitive to said roll of said robot for developing a signal representative of the degree of said roll to control the operation of said detection system to compensate for the effect of said roll on said antenna response; and means for utilizing said orthogonal direction signals to control the resultant direction of said robot with respect to the scanning axis of said radar beam.

4. A control system for a robot device subject to roll, comprising: an antenna on said robot responsive to a component of a plane-polarized conically scanning radar beam having a rotating plane of polarization; means coupled to said antenna for developing a fluctuating unidirectional signal representative of each of said components; a signal amplitude detection system coupled to said means for deriving a direction control signal from said unidirectional signal; a control circuit coupled to said detection system and sensitive to said roll of said robot for developing a signal representative of the degree of said roll to control the operation of said detection system to compensate for the effect of said roll on said components; and means for utilizing said direction signal to control the direction of said robot with respect to the center axis of said radar beam.

5. A control system for a robot device subject to roll, comprising: an antenna system on said robot responsive to orthogonal electric components of a plane-polarized, conically scanning radar beam, having a rotating plane of polarization; means coupled to said antenna for developing fluctuating unidirectional signals representative of each of said components; a signal amplitude detection system coupled to said means for deriving a pair of direction control signals representative of orthogonal directions from said unidirectional signals; a control circuit coupled to said detection system and sensitive to said roll of said robot for developing a signal representative of the degree of said roll to control the operation of said detection system to compensate for the effect of said roll on said components; and means for utilizing said direction signals to control the direction of said robot with respect to the center axis of said radar beam.

6. A control system for a robot device subject to roll, comprising: an antenna system on said robot responsive to horizontal and vertical electric components of a plane-polarized, conically scanning radar beam having a rotating plane of polarization; means coupled to said antenna for developing fluctuating unidirectional signals representative of each of said horizontal and vertical components; a signal amplitude detection system coupled to said means for deriving a pair of direction control signals representative of positions of said device along mutually orthogonal axes perpendicular to the center axis of said beam; a control circuit coupled to said detection system and sensitive to said roll of said robot for developing a signal representative of the degree of said roll to control the operation of said detection system to compensate for the effect of said roll on said components; and means for utilizing said direction signals to control the horizontal and vertical directions of said robot with respect to the center axis of said radar beam.

7. A control system for a robot device subject to roll, comprising: an antenna on said robot responsive to electric components of a plane-polarized, conically scanning radar beam having a rotating plane of polarization; means coupled to said antenna for developing a fluctuating unidirectional signal representative of the envelopes of said components; a signal amplitude detection system coupled to said means for deriving a direction control signal from said unidirectional signal; a control circuit including a bistable multivibrator, a controlled oscillator and a gyroscope coupled to said detection system, said gyroscope being sensitive to said roll of said robot for developing a signal representative of the degree of said roll to control the operation of said multivibrator through said oscillator to compensate for the effect of said roll on said components; and means for utilizing said direction signal to control the direction of said robot with respect to the center axis of said radar beam.

8. A control system for a robot device subject to roll, comprising: an antenna on said robot responsive to electric components of a plane-polarized, conically scanning radar beam having a rotating plane of polarization; means coupled to said antenna for developing a fluctuating unidirectional signal representative of said components; a signal amplitude detection system coupled to said means for deriving a direction control signal from said unidirectional signal; a bistable multivibrator coupled to said means and to said detection system and responsive to said unidirectional signal for controlling the timing of said detection system; an automatic frequency control system coupled to said means and to said multivibrator and responsive to said unidirectional signal to control the frequency of operation of said multivibrator in phase with said unidirectional signal; a gyroscope coupled to said automatic frequency control system and sensitive to said roll of said robot for shifting the phasing of the signal generated by said automatic frequency control system and of the operation of said multivibrator to compensate for the effect of said roll; and means for utilizing said direction signal to control the direction of said robot with respect to the center axis of said radar beam.

9. A control system for a robot device subject to roll, comprising: an antenna system on said robot responsive to horizontal and vertical electric components of a plane-polarized, conically scanning radar beam having a rotating plane of polarization; means coupled to said antenna for developing fluctuating unidirectional signals representative of each of said horizontal and vertical components; a signal amplitude detection system coupled to said means for deriving a pair of direction control signals representative of horizontal and vertical positions from said unidirectional signal; bistable multivibrator circuits coupled to said means and to said detection system and responsive to said unidirectional signals for controlling the timing of said detection system; automatic frequency control systems coupled to said means and to said multivibrator circuits and responsive to said unidirectional signals to control the frequency of operation of said multivibrator circuits in phase with said unidirectional signals; a gyroscope coupled to said automatic frequency control systems and sensitive to said roll of said robot for shifting the phasing of the signals generated by said automatic frequency control systems and of the operation of said multivibrator circuits to compensate for the effect of said roll; and means for utilizing said direction signals to control the horizontal and vertical directions of said robot with respect to the center axis of said radar beam.

References Cited in the file of this patent

UNITED STATES PATENTS

| | | |
|---|---|---|
| 2,557,401 | Agins | June 19, 1951 |
| 2,578,241 | Guanella | Dec. 11, 1951 |
| 2,616,640 | Bedford | Nov. 4, 1952 |
| 2,782,131 | Lattmann | Feb. 3, 1959 |